June 28, 1927.
R. P. CLARK
FRUIT PACKER
Filed Jan. 26, 1927
1,633,571
2 Sheets-Sheet 1
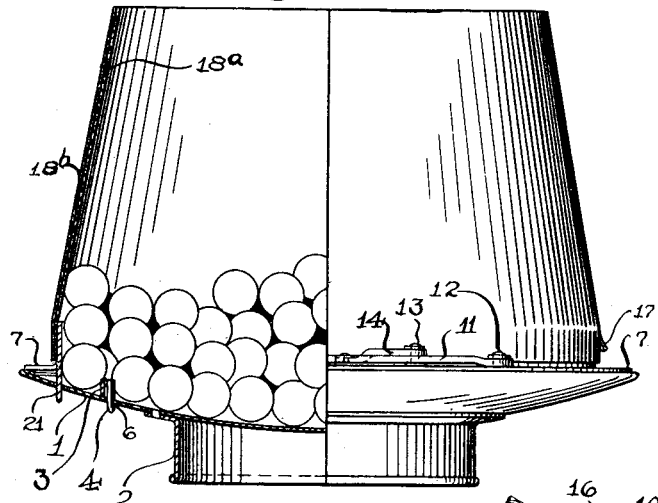
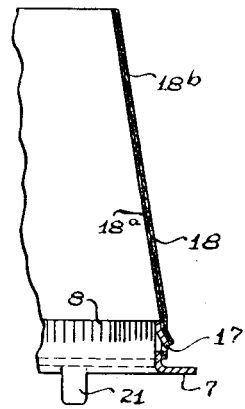
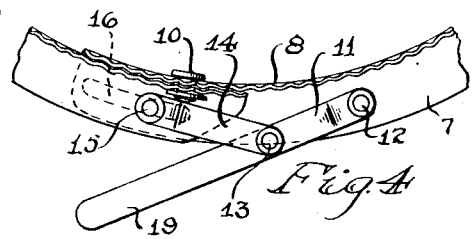
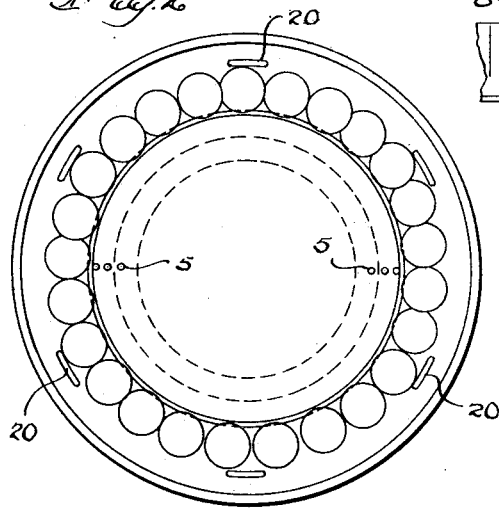
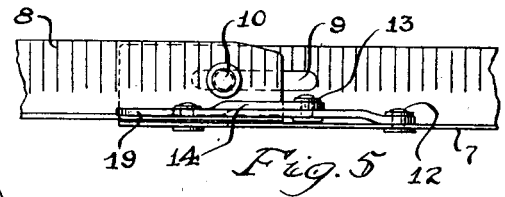
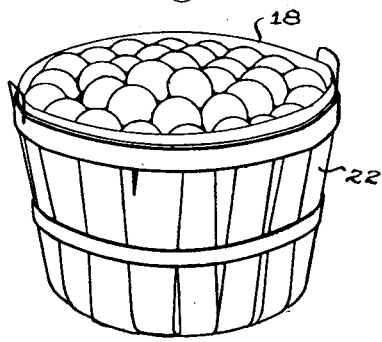
INVENTOR
Raymond P. Clark
BY
H. H. Simms
his ATTORNEY June 28, 1927.
R. P. CLARK
1,633,571
FRUIT PACKER
Filed Jan. 26, 1927
2 Sheets-Sheet 2
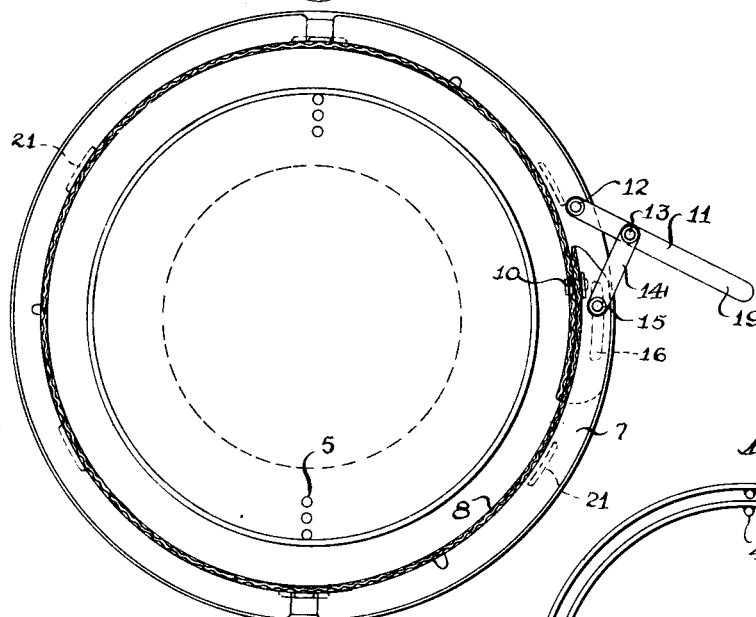
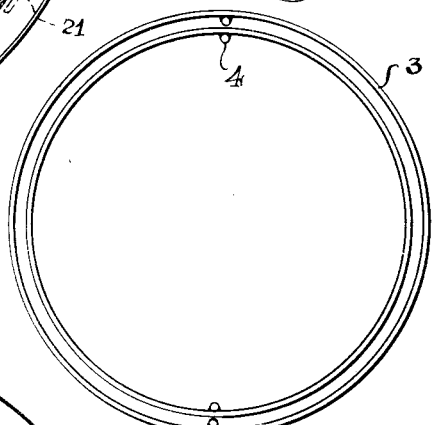
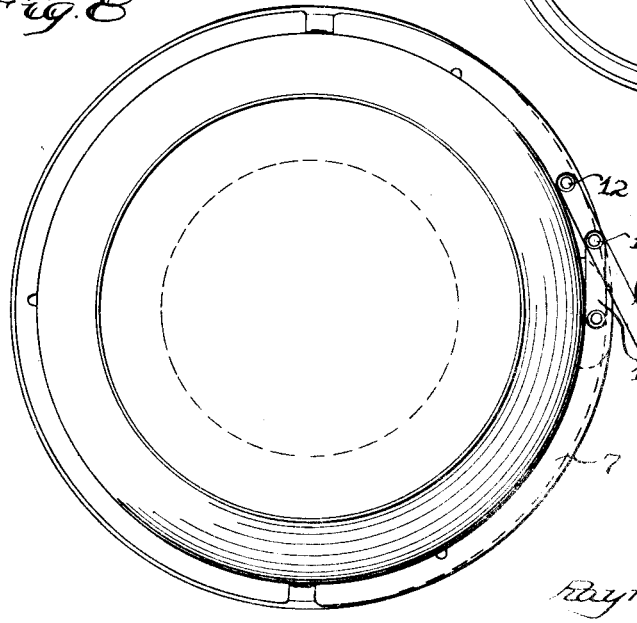
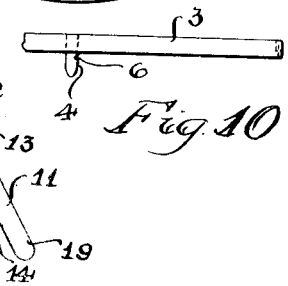
INVENTOR
Raymond P. Clark
BY
his ATTORNEY Patented June 28, 1927.

1,633,571

UNITED STATES PATENT OFFICE.

RAYMOND P. CLARK, OF ROCHESTER, NEW YORK, ASSIGNOR TO CLARK PAPER & MANUFACTURING CO., OF ROCHESTER, NEW YORK, A CORPORATION OF NEW YORK.

FRUIT PACKER.

Application filed January 26, 1927. Serial No. 163,826.

The present invention relates to fruit packers and an object thereof is to provide a construction through which the outer fruit ring is positioned on the facing form in cooperation with a guide engaging the inside of such ring. Another object of the invention is to provide a facing form in which means is employed for cooperating with the inner side of the outer fruit ring of different sized apples. Another object of the invention is to provide a plurality of rings of different diameters adapted for individual attachment to a facing form to provide a guide wall for cooperating with the inner surface of an outer fruit ring placed on the facing form. Another object of the invention is to provide an expansible liner holder which will engage the liner in a manner to hold the latter against displacement on the facing form. Still another object of the invention is to provide an expansible split ring for engagement with the interior of an open ended liner to hold the latter to a facing form. A further object of the invention is to provide a liner holder adapted to be connected with a liner while said holder is disconnected from the facing form and to be connected to the facing form to support the liner in operative position thereon. A still further object of the invention is to provide a liner holder separable from the facing form and when, upon the facing form, being held against movement to disconnect the liner therewith. Still another and further object of the invention is to provide an improved liner having a non-absorbent inner layer and an outer layer of strengthened material.

To these and other ends, the invention consists of certain parts and combinations of parts, all of which will be hereinafter described, the novel features being pointed out in the appended claims.

In the drawings:

Fig. 1 is a view of the packer showing one-half in vertical section and the other half in elevation;

Fig. 2 is a plan view of the facing form with an outer fruit ring in position thereon;

Fig. 3 is a fragmentary sectional view showing the liner holder with a liner attached thereto;

Fig. 4 is a fragmentary top view of the expanding means for the liner holder;

Fig. 5 is a similar view of the same parts in elevation;

Fig. 6 is a view of a fruit basket showing the liner in position therein;

Fig. 7 is a plan view of the fruit packer showing the liner removed;

Fig. 8 is a similar view showing the liner in position on the fruit packer;

Fig. 9 shows two of the guide rings, and

Fig. 10 is a fragmentary view of one of the guide rings.

In the illustrated embodiment of the invention, there is provided a facing form comprising in this instance a concavo-convex disk or plate 1 having a depending supporting flange 2 on its under side.

In the facing of fruit on a facing form, it is customary to arrange the fruit in concentric rings. To obtain these rings two means have heretofore been provided. One of these means consists in the forming of concentric grooves in the face of the form to define the concentric ring. This construction is objectionable in that apples vary in size and concentric grooves made for apples of one size are not adapted for facing apples of another size. The other type of facing form has a cylindrical wall adjacent the perimeter of the form against which the outermost ring has its outer perimeter brought into abutment. This latter construction of the facing form is also objectionable in that the apples cannot be maintained against this outer guide wall due to the fact that they tend to roll toward the center of the form which has been made concave in order to give a convex facing to the fruit in the container.

Both of these objections are overcome in the present invention, which preferably embodies a plurality of guide rings 3 of different diameters, each of these rings in this instance having pins or projections 4 depending therefrom in order to engage within openings 5 formed in the facing plate 1, the projections 4 having notches 6 and the rings 3 being formed of resilient metal so that they may be flattened slightly sidewise in order that their projections 4 may be passed through the openings 5, after which the rings expand and the projections through the notches 6 interlock with the walls of the openings 5, thus effectively securing the rings in position on the facing form. The projections 4 with the walls of the openings 5 provide cooperating separable means on the rings and the facing form to hold the rings to the form. Any desired number of these rings may be employed but it has been found that three give a sufficiently wide range. Only one of these rings is employed at any one time, the largest ring for the smallest apple and the smallest ring for the largest apple. It will be noted that each ring when in position on the facing form lies in spaced relation to the perimeter of said form so as to provide a surface between the ring and the perimeter on which a ring of apples may be placed this ring forming the outer ring of the facing layer. After the outer ring has been arranged, the apples are dumped in its center to fill the same and can then quickly be adjusted or shifted to provide the concentric arrangement throughout the facing layer. It is believed that this feature of providing a guiding ring or surface for the inner periphery of the outer apple ring with a smooth surface within this guide ring is novel. It is also believed to be novel to provide means adjustable for apples of different sizes for cooperating with the inner side of the outer apple facing ring.

Another feature of this invention is the provision of a novel means of supporting a liner on the facing form so that within the liner may be placed the fruit which is to be contained within the receptacle below the facing layer the receptacle being fitted over the liner in an inverted position after the liner is filled and the whole being inverted to leave the liner and the fruit within the receptacle.

The liner holding means, in this instance, is entirely separate from the facing form and is attached to the liner before the latter is connected to the facing form. This liner holder, preferably embodies a ring having an outwardly presented flange 7 and an upwardly presented flange 8, the latter being corrugated slightly to give a slight taper to the upwardly presented flange. This liner holding ring is expansible and contractible and to this end it is split, the flange 8 near one end having a slot 9 in which a headed rivet 10 on the overlapping end of the split ring operates.

The expansion and contraction of the liner holding ring may be effected in any suitable manner. In this instance, a toggle has a lever 11 pivoted at 12 to the flange on flange 7 near one side of the slit. To this lever is pivoted at 13, a link 14 forming the other member of the toggle and in turn pivoted at 15 to the flange 7 of the overlapping portion of the split ring. The pivot 7 is extended through a slot 16 in the adjacent portion of the flange 7 and acts to guide the two ends of the ring. The flange 8 may have downwardly extending spears or projections 17 pressed outwardly therefrom to engage and penetrate an open ended liner 18 of frustoconical formation. The liner 18 is fitted on the flange 8 while the liner holding ring is contracted through the movement of the operating lever 19 as shown in Fig. 4. After the liner is in position the holding ring is expanded through the movement of the operating lever 19 inwardly thus elongating the toggle. Owing to the fact that the ring is separate from the facing form it may be readily fitted within the liner by one person while another person is facing the facing form. It also permits a binding engagement to be established between the liner holder and the liner.

A novel means is employed for supporting the liner and its holding member detachably on the facing form, this means, in this instance, acting to prevent the contraction of the holding ring while the latter is on the facing form. The facing form may to this end be provided with a plurality of slots 20 while the liner holding ring has depending projections 21 adapted to fit into the slots or openings 20, and when, in said slots, holding said liner ring in its expanded condition so that the accidental displacement of the liner from the holding ring cannot take place. The holding ring engages the liner internally and places the engaged edge under tension. The projections 21 and the walls of the openings 20 provide cooperating separable portions on the liner ring and the facing form.

Still another feature of this invention is the provision of a novel liner construction. The liner has its inner face 18$^a$ formed of a layer of non-absorbent material so that it will not crock, stain, or taint the fruit contacting therewith. This inner layer is preferably made from news pulp which is rendered non-absorbent by sizing in the beater. The material of which this layer is made would not give sufficient strength to the liner if the latter were made completely of this material, and in order to give the liner sufficient strength an outer layer 18$^b$ is provided which is made of chipped stock which has greater strength than the inner layer. A liner so constructed has such strength that when supported at its lower edge no other support will be necessary while the fruit is being placed therein.

In using this invention, one of the rings 3, depending on the size of the apples, is fitted to the facing form 1. The apples which are to face the basket are then placed on the form and are adjusted by hand so as to provide a ring or circle of apples on the outer side of the ring 3. Thereafter, the other apples within the ring 3 are arranged in concentric rings. The liner 18 is fitted to the removable liner holder, the latter, being first contracted by the breaking of the toggle and then expanded within the larger end of the liner, causing the guide wall of the liner to bind on the inner face of the liner, the spears or projections 17 acting to hold the liner to the holder. The holder with the liner thereon is now fitted to the facing form the projections 21 entering the notches 20 and holding the liner holder against expansion and contraction so that the disconnection or connection of the liner with liner holder while the facing form is being used is prevented. The liner is now filled with apples and thereafter the container 22 is fitted in an inverted position over the liner. The facing form, liner holder, liner, and contents of the liner are now inverted, causing the fruit to be deposited in the receptacle 22. The facing form is next removed carrying with it the guide ring 3 and thereafter the liner holding ring is detached from the liner. As the liner is held by the lining holder the fruit during the inversion shifts bodily in the liner so that the upper edge of the liner will project above the upper edge of the basket 22 as shown in Fig. 6, thus, providing a portion of the liner which may be turned inwardly over the facing layer in order to protect the latter at its outer edge after a cover has been secured to the basket or receptacle.

What I claim as my invention and desire to secure by Letters Patent is:

1. A facing form for fruit packers having an annular guide wall extending upwardly from the face of said form and spaced at its edge from the edge of the form to provide on the outer side of the ring a surface on which a ring of fruit may be arranged, the surface of the form within said guide wall being smooth.

2. A facing form for fruit packers having a smooth concave face and a guide ring projecting upwardly from said face in spaced relation to the edge of said face so as to provide a surface beyond a guide wall on which a ring of fruit may be arranged.

3. A facing form for fruit packers having a facing face, and means providing an annular guide wall at different distances from the outer edge of said face for cooperating with the inner side of the outermost ring of fruit to be formed on the face.

4. A facing form having a facing face, and means providing an annular guide wall at different distances from the edge of the facing form for cooperating with the inner side of the outermost ring of fruit to be formed on the face, said means comprising a plurality of rings of different diameters, and cooperating means on the rings and the facing form for positioning said rings.

5. A facing form having a facing face, a ring, and cooperating separable means on the ring and the facing form for positioning the ring in spaced relation to the outer edge of the facing form in order that the ring may cooperate with the inner side of the outermost ring of fruit to be placed on the facing form.

6. A facing form having a facing face, a ring, and cooperating separable means on the ring and the facing form for positioning the ring in spaced relation to the outer edge of the facing form in order that the ring may cooperate with the inner side of the outer-most ring of fruit to be placed on the facing form said means comprising projections on the ring and portions on the facing form provided with openings in which said projections may be engaged.

7. A fruit packer comprising a facing form, and an expansible liner holding means for supporting a liner on the form.

8. A fruit packer comprising a facing form, and a split ring having a portion for engaging the interior of a liner to hold the latter on the form, and means connecting with the ring to expand the latter on the interior of the liner.

9. In a fruit packer, the combination with a facing form, of holding means for holding a liner on the facing form embodying a split ring for cooperating with a liner and means for connecting portions on opposite sides of the split to expand and contract the ring.

10. In a fruit packer, the combination with a facing form, of means for supporting a liner on the facing form comprising adjustable means constructed to project within the liner to engage the inner face thereof.

11. In a fruit packer, the combination with a facing form, of means for supporting a liner on a facing form comprising a split ring for projecting within the liner to engage the inner face thereof, and means for expanding the ring to effect such engagement.

12. In a fruit packer, the combination with a facing form, of means for supporting a liner on a facing form comprising a split ring for projecting within the liner to engage the inner face thereof, and means for expanding the ring to effect such engagement and projections carried by the ring for penetrating the liner to hold the latter to the ring.

13. In a fruit packer, the combination with a facing form, of a liner holder having detachable connection with the facing form and having means for effecting engagement with the liner while the holding means is detached from the facing form.

14. In a fruit packer, the combination in a facing form, of a split ring having a portion adapted to project within a liner to engage the inner face thereof, and cooperating separable means on the split ring and the facing form for detachably securing the ring to the facing form.

15. In a fruit packer, the combination with a facing form, of means for supporting a liner on the facing form comprising a split ring having a portion adapted to engage the interior of the liner, means for expanding the split ring to cause the liner to enter into binding engagement with the split ring, and cooperating separable portions on the split ring and the facing form for holding the split ring to the facing form and for preventing the contraction of the ring.

16. In a fruit packer, the combination with a facing form, having openings, of a liner holder embodying a split ring formed with an upwardly extending flange for projecting within the liner and also with an outwardly projecting flange, a lever pivoted to the outwardly extending flange at one side of the split, a link pivoted to the lever and to the outwardly extending flange at the other side of the split for expanding and contracting the ring on the movement of the lever, and lugs depending from the ring for engagement in the openings of the facing form.

RAYMOND P. CLARK.